June 9, 1931.  R. DE FILIPPIS  1,808,766
VEHICLE
Filed Jan. 29, 1930   4 Sheets-Sheet 1
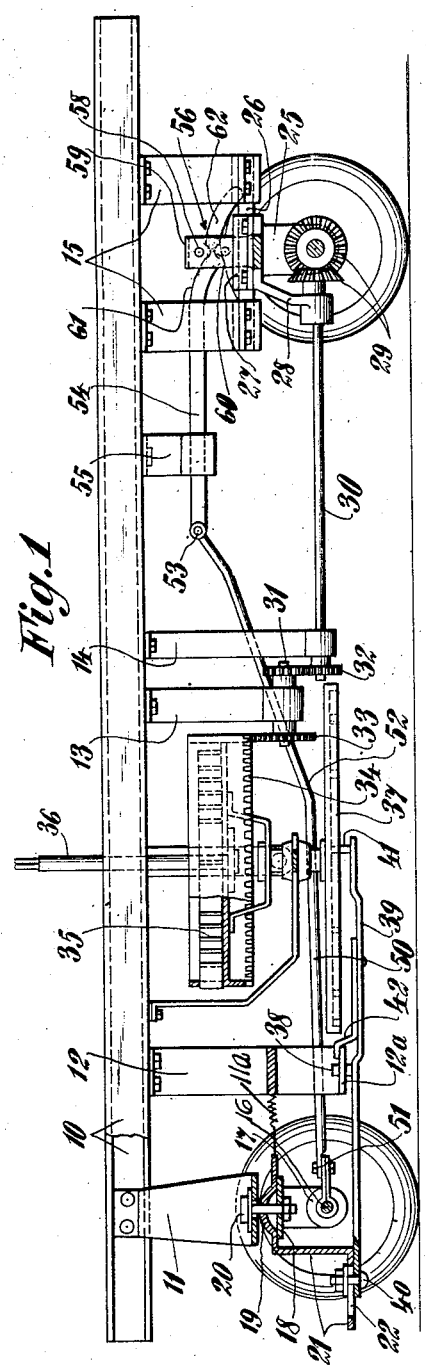
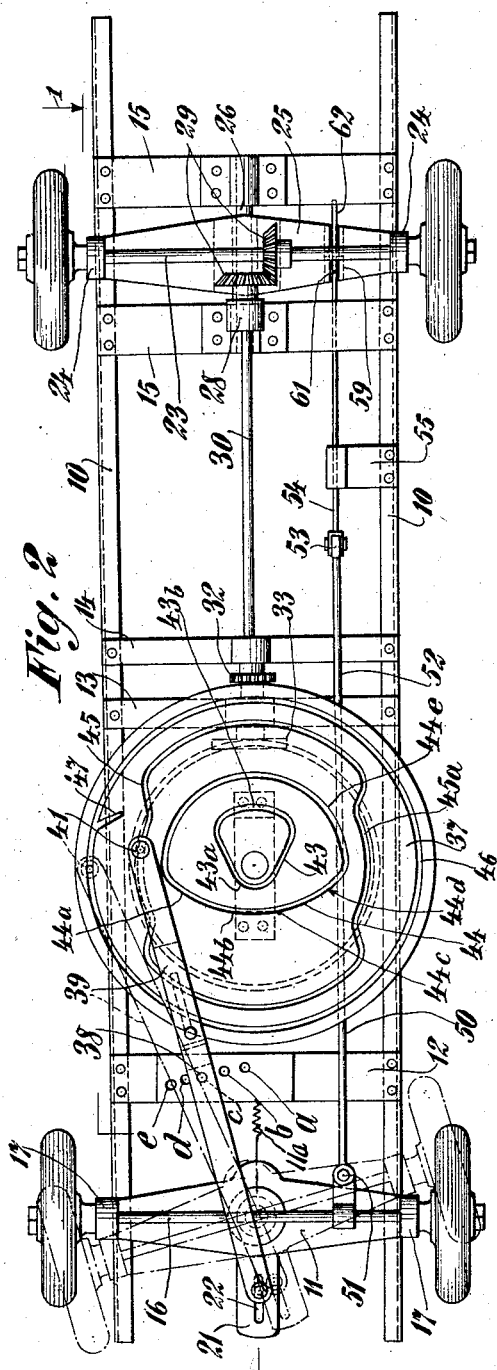
INVENTOR
Raymond de Filippis
BY Louis Schumacher
ATTORNEY June 9, 1931.　　　R. DE FILIPPIS　　　1,808,766
VEHICLE
Filed Jan. 29, 1930　　　4 Sheets-Sheet 2
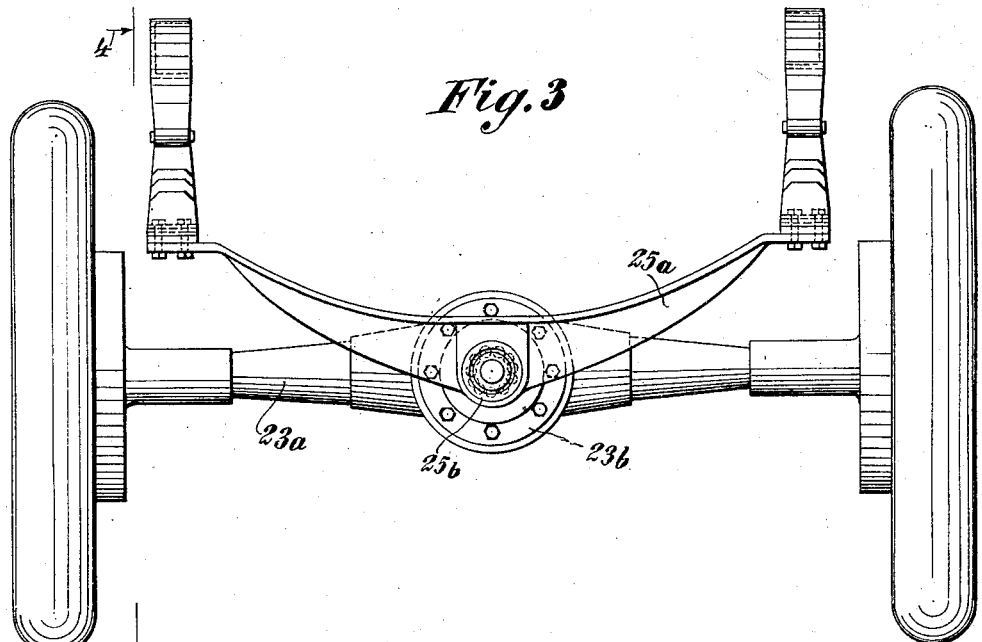
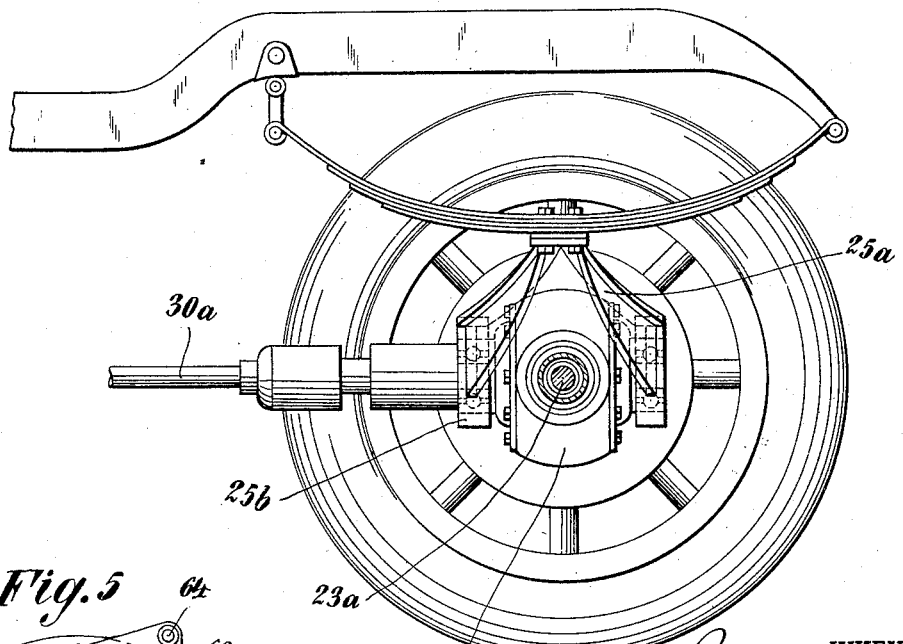
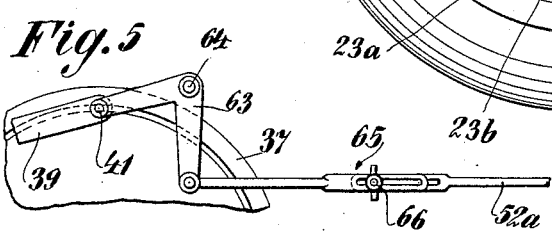
INVENTOR
Raymond de Filippis
BY Louis Schumacher
ATTORNEY

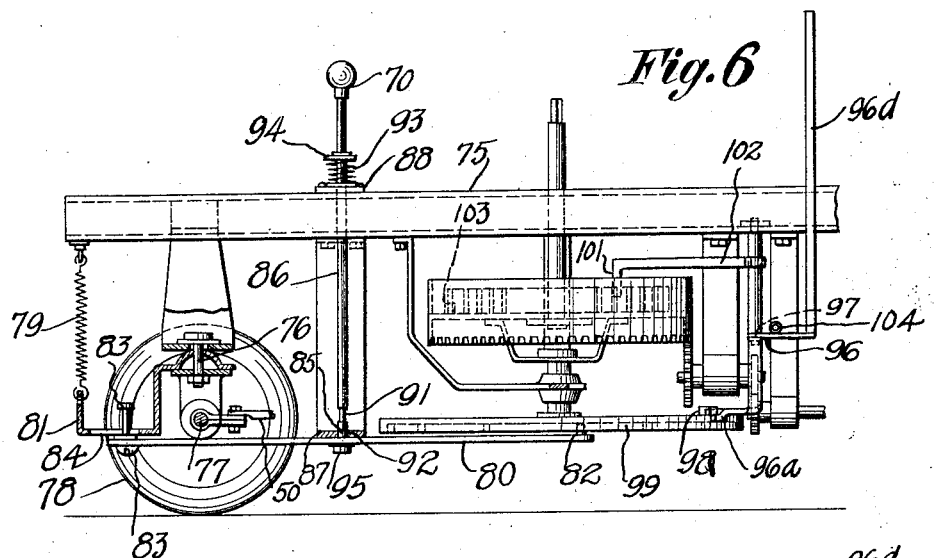

June 9, 1931.  R. DE FILIPPIS  1,808,766

VEHICLE

Filed Jan. 29, 1930 4 Sheets-Sheet 4

INVENTOR
Raymond de Filippis
BY
ATTORNEY

Patented June 9, 1931

1,808,766

UNITED STATES PATENT OFFICE

RAYMOND DE FILIPPIS, OF BROOKLYN, NEW YORK

VEHICLE

Application filed January 29, 1930. Serial No. 424,157.

This invention relates to vehicles, and while it is designed particularly for development along the lines of mechanical toys or toy vehicles, I wish it to be understood that the scope of the invention is not to be limited unnecessarily to toys, for certain features of the improvement are capable of employment in other types of vehicles.

Among the objects of the invention is to provide a vehicle with improved means including automatic steering gear so devised and constructed as to produce a variety of results as to direction of movement or behavior of the vehicle according to a considerable range or variety of adjustments, the vehicle being adapted to be operated by any suitable species of power.

Another object of the invention is to improve the axle and chassis construction so as to increase the reliability of the tractive effect of power vehicles, as well as to increase the durability of the machine and the comfort incident to the riding in or upon such machine, particularly riding over a rought roadway.

More specifically, one of the objects of the invention is to provide an automatically steered vehicle having front and rear axles, a pair of wheels on each axle, and improved connections between the axles and the chassis that will insure not only the desired rotative flexibility of the front axle, but also the capability of relative rocking movement between the front or rear axle and the chassis along an axis substantially parallel to the line of movement of the vehicle.

Other objects are to provide a device of the nature set forth, in which the steering wheels, the steering cams, and the means coordinating the same have an improved relation facilitating the inter-connection with the different cams in a simplified manner; also to provide improved actuation for the said co-ordinating means.

A further object of the invention is to provide for improved positive adjustment of the center of gravity coincident with the turning of the vehicle, whether the same be automatic or otherwise.

Still a further object of the invention is to provide a vehicle having improved means for relative movement of the wheels in riding over a rough roadway, so that all the wheels will contact the roadway, and also to shift the center of gravity of the vehicle in making a turn so as to stabilize the same.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings in which like reference characters designate the same parts in the several views, and in which—

Figure 1 is a side elevation of a preferred embodiment of the invention as applied to the vehicle chassis and traction means, with parts in section on the line 1—1 of Fig. 2.

Fig. 2 is a bottom plan view of the construction of Fig. 1, full lines indicating one adjustment of the steering mechanism for straight movement, and broken lines indicating change of position of the steering mechanism while the machine is making a right turn.

Fig. 3 is a rear elevation of the improved rear axle connection mechanism on an enlarged scale.

Fig. 4 is a side elevation of the same with parts in section on the line 4—4 of Fig. 3.

Fig. 5 is a fragmentary view of a modification of the invention.

Fig. 6 is a fragmentary view in side elevation of a modification of the invention.

Fig. 7 is a bottom plan view thereof.

Fig. 8 is a fragmentary top plan view of a detail of the invention.

Figure 9:
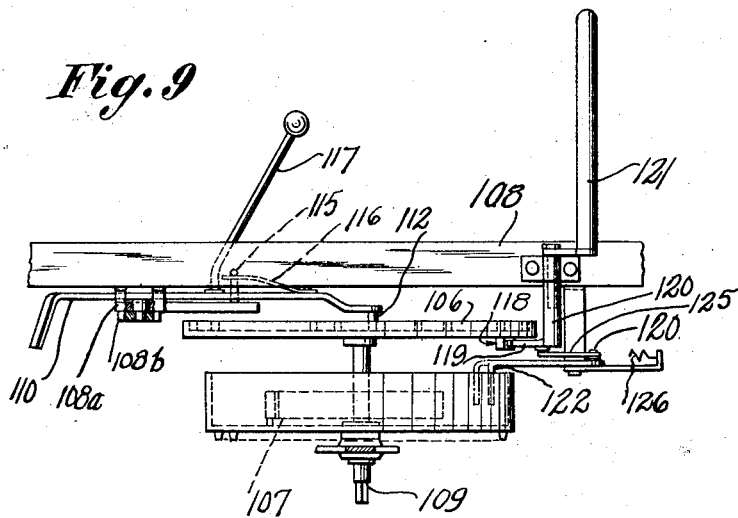
Fig. 9 is a fragmentary view in elevation of a modification of the invention.

Referring now more specifically to the drawings, I indicate as representative of power operated vehicle chassis, a pair of side bars 10 between which extend a series of cross braces or brackets 11, 12, 13, 14, and 15. The number of these cross pieces may be greater or less and the arrangement thereof different from that indicated in the drawings without departing from the spirit of the invention.

The front axle 16 is journaled adjacent to the wheels in bearings 17 fixed to or constituting parts of the bolster 18 having vertical center bearing at 19 through a king pin 20 with the bracket 11. This bearing 19 is so designed as to permit not only the usual rotation around the axis of the king pin, but also a certain limited amount of lateral rocking of the front axle and bolster with respect to the chassis. Extending forward from the bolster 18 and constituting in effect a rigid part thereof is an arm 21 having a forwardly directed slot 22, the center line of said slot being perpendicular to the center line of the axle 16, but indicated as being below the horizontal plane of the axle.

The rear axle 23 is journaled in bearings 24 adjacent to the wheels and constituting a part of the rear bolster 25. Whereas the usual arrangement is for a rear axle to be more or less rigidly fixed to the rear portion of the chassis, in this instance the bolster 25 is free at its ends from the chassis and is connected by center supporting means including a short sturdy shaft 26 mounted upon the brackets 15 and in a plane parallel to and midway between the rear wheels. The shaft 26 is clamped to the brackets 15 and has journaled between the brackets a sleeve or bearing 27 constituting a part of the bolster structure. A forwardly and downwardly projecting bearing arm 28 is another part of the same structure.

Any suitable means may be provided for the application of power to the traction wheels of the vehicle. As shown herein the rear wheels only are propelling wheels and a pair of miter gears 29 connect the rear axle 23 with the driving shaft 30, the latter being journaled in the bearing 28 at the rear end and in the bracket 14 at the forward end. A counter shaft 31 is journaled in the bracket 13, and a pair of spur gears 32 fixed to the shafts 30 and 31 transmit power from one to the other. The shaft 31 is shown herein as being driven by means of a gear 33 fixed to the forward end of the counter shaft and meshing with a crown gear 34 adapted to be actuated by means of a spiral spring 35 or its equivalent, the power in which is stored by rotation of a key or crank shaft 36 in any well known manner. A steering disk 37 is mounted below the gearing above described and coaxial of the crown gearing. Suitable pawl and ratchet mechanism is provided for connecting the disk 37 operatively with the spring mechanism so that the disk 37 will rotate in unison with the crown gear under the influence of the spring and synchronously with the actuation of the gearing between the crown gear and the driving mechanism.

The bottom portion 12a of the bracket 12 is flat and provided with a series of selective holes $a$, $b$, $c$, $d$, and $e$ for co-operation with a pin 38 carried by a steering lever 39 whose forward end carries a pivot 40 operating in the slot 22, while the rear end of the lever has a pin 41 co-operating with any selected groove formed in the surface of the disk 37. The connection of the front end of the lever 39 with the front axle structure is permanent although the pin 40 is adapted to glide forward and rearward along the slot 22 during adjustment and operation of the machine. The pin 41 at the rear end of the lever, however, may be withdrawn freely from any groove in which it may be located and placed in any other groove. Likewise the pin 38 at the same time may be placed in any one of the bearing holes $a$ to $e$ inclusive. A spring 42 connected to the lever 39 and engaging over the upper surface of the flat portion 12a of the bracket 12 is effective to hold the pins 38 and 41 according to the adjustment desired.

The disk 37 is shown provided with a series of four or five grooves, all of which are grouped around the center or axis of the driving mechanism. These grooves are indicated at 43, 44, 45, and 46, and all of them are of compound curvature or in the nature of cams except the last mentioned, but this one is provided with an off-shoot 47, making in effect two grooves instead of one adjacent to the periphery of the disk. The groove 46 considered alone is concentric and circular, while all the others are eccentric and act as cams for at least a portion of the rotation of the disk.

The groove 43 comprises two parts, an inner concentric portion 43a of short radius, and an outer concentric portion 43b of longer radius. These two arcs 43a and 43b are connected by cam grooves so as to make one continuous groove 43. With the front wheels and axle in normal straight-away position and the pin 38 adjusted in the bearing hole $a$, and with the pin 41 adjusted in the groove 43, the driving mechanism being in operation and the disk caused thereby to be rotated, the vehicle will be moved straight forward during the period corresponding to the time for half rotation of the disk. The pin 41 will then enter one of the cam portions of the groove 43 and the lever 39 will be swung outward from the center of the disk, pivoting around the axis of the pin 38 and causing a right turn of the vehicle, a condition corresponding to that shown in broken lines in Fig. 2. This right turn will continue while the machine makes a half circle on the floor or roadway by which time the pin 41 will have returned to the portion 43a of the groove, the result being that the machine will then make a return straight movement for a period of time corresponding to the half turn of the disk 37 when it will again make a half circle turn to the right. The adjustment of the lever 39 with the pin 38 in the second hole *b* and the pin 41 in the groove 44 will produce a continuous figure 8 or a figure equivalent to two circles externally tangent to each other. To produce this result the disk will be so positioned that with the front axle in the position shown in full lines in Fig. 2, the pin 41 will occupy a position substantially at the point 44*a*. Rotation of the disk will cause the pin 41 to approach the center of the disk and so cause the wheels to make a swinging movement corresponding to a left turn of the vehicle. This turning movement will be completed at about the time the pin reaches the point 44*b* and will be continued until the point 44*c* is reached at which time the pin 41 will be movable outward from the axis of the disk and completing one of the two circles at about the point 44*d*, it being understood that the starting point of the figure will be at the point of tangency of the two circles or where the two compound curves cross each other. By this time the wheels are straight again and ready to be given a right turn while the pin 41 passes onward over the crest of the cam and into the concentric portion 44*e* of the groove 44 where it will remain until the second circle will be described by the machine and then returned again to its original starting point 44*a*. It will thus be apparent that while the two arcs or portions of the groove 44 that are each concentric with the disk are different in extent, they are practically equivalent as to angular movement of the disk so that their times are equal and the resulting figure will be a perfect 8 or two equal tangent circles.

Likewise the adjustment of the lever 39 so as to bring the pin 38 in the third hole and the pin 41 in the groove 45, a condition will obtain according to the showing in full lines in Fig. 2, and with the vehicle making a straight forward movement. The groove 45 includes an inner circular part 45*a*, and another outer circular part concentric therewith. The transition, however, from one part to the next is through a cam connection, hence with the rotation of the disk, the vehicle will make a half turn after the pin 41 passes out of the groove 45*a* in which it is at present located, the turning of the vehicle taking place while the pin 41 operates along the outer portion or the substantial equivalent of one quarter of the disk. At the end of this groove outer groove, the pin will be drawn inward toward the center of the disk and into the groove 45*a* and the machine will make another straight run during the period of time corresponding to one quarter rotation of the disk and so on. The grooves 43 and 45 are similar in this that each of them produces a certain straight-away and then a half turn of the vehicle and then again a straight-away, but the groove 45 produces twice as many turns as the one first described.

The directions for the operation of this machine or toy contemplate that in the adjustment of the steering lever with respect to the fulcrum bracket 12 and disk 37 the front axle shall be approximately in the position shown in full lines in Fig. 2. Consequently with the adjustment of the lever with its pin 38 in the fourth hole *d*, and the pin 41 in the groove 47, the wheels may be set for straight-away, but immediately after the machine starts to move the pin 41 will enter the circular and continuous groove 46 so that the machine will make a constant uniform circle. In effect while the machine is operating the pin 38 has a fixed position, while the pin 41 in most instances is movable inward or outward with respect to the axis of the disk. Also the front axle is caused to swing around its vertical axis during the swinging movements of the lever 39. Therefore it is essential that the slot 22 be provided to accommodate the more or less forward and rearward movements of the pin 40, such movements, however, being secondary to the lateral swinging movement for the turning of the front axle for steering purposes.

To automatically return the front steering wheels to straight-away position, a tension spring 11*a* may be provided, the purpose of which will be particularly indicated hereinafter in connection with the modification shown in Figs. 6 to 8 in which it has a special advantage.

In the operation of power driven or traction vehicles, it is essential that both of the driving wheels be maintained in frictional contact with the brake or roadway at all times so as to prevent the spinning of either wheel when running idly out of contact with the track or roadway. Also for the comfort of the riders in the vehicle or safety of the vehicle itself or load carried thereby, it is important that the driving axle shall be free to tilt laterally with respect to the body of the vehicle and around an axis parallel to the line of movement. To this end I mount the rear axle 23 and bolster 25 as described above upon the axle or shaft 26 which permits the rear axle to tilt as just specified and without disturbing materially the normal position or action of the vehicle body or frame and also without disturbing essentially the driving mechanism which is arranged in the same vertical fore and aft plane as the axle and shaft 26. The mechanism shown in Figs. 3 and 4 is a carrying forward of the same idea and illustrated as applicable to practical passenger or truck constructions. In these figures the rear axle 23*a* is provided with a housing 23*b* for the differential mechanism not shown and with which connects the fore and aft driving shaft 30*a*. Associated with the axle and housing is a bolster 25*a* shown as split or divided and embracing the housing 23*b* on opposite sides and connected therewith through anti-friction bearings 25b. As shown the entire connection between the bolster and the axle structure is along a line coincident with the axis of the shaft 30a and midway between the parallel to the planes of the wheels. It follows, therefore, that the rear axle and wheels are comparatively free to tilt up or down around the axis just referred to, thus assuring that the wheels shall be maintained in frictional contact with the roadway at all times and will relieve the vehicle body from a great deal of the effect of rough or uneven roads.

To afford the maximum stability to the vehicle in making a turn, the center of gravity of the same is shifted in any suitable manner automatically, or by manually operated mechanism. This result obtains regardless of the direction of the turn. It may also be made to vary with the sharpness of the turn.

In causing the shifting of the center of gravity, the means hereinbefore described whereby all the wheels of the vehicle may remain constantly on the roadway despite any unevenness on the surface thereof, or any equivalent means, may be utilized and combined with any suitable part of the steering mechanism, for automatically changing the center of gravity. While the movement of the wheels, as, for example, those of the axle 23 may respond to the nature of the roadway in straight-away driving, yet in the turning of the vehicle, such movement becomes positive and predetermined.

One embodiment of these features of the invention may include a bar 50 pivotally connected at 51 with the front steering axle 16 of the vehicle. This bar may be offset at 52 to clear certain portions, and has pivotally connected thereto at 53 a member 54 which is slidably mounted for reciprocating movement in a guide 55. The member 54 actuates a cam 56. The cam operates between rollers 58 carried on a bracket 59 that is rigidly secured to the member 25. The cam 56 has a central narrow or recessed portion 60, from which the larger cam portions 61, 62 extend symmetrically upward and downward at an angle to the axle 23.

The operation of the device will now be clearly apparent. When the vehicle is driving straight ahead, the central cam portion 60 is between the rollers 58, but out of contact therewith. This permits the rear axle 23 to oscillate about its horizontal axis to respond to irregularities in the surface of the road. When the vehicle turns, the cam 56 is moved in a corresponding direction bringing one of the cam portions 61 or 62 into engagement with the rollers and positively moving the rear axle about its horizontal axis to shift the center of gravity for stabilizing the vehicle during the turn.

In Fig. 5 is shown a modification of the invention in which the said cam 56 is directly co-ordinated with the automatic steering means 37. This may be accomplished by the provision of a member that may coact with any of the steering grooves, to operate the cam 56 in entire uniformity therewith. For example, the pin 41 may have connected thereto a movable part, such as a bell crank lever 63 which is mounted on a fixed pivot 64. Connected to the bell crank lever is a bar 52a, analogous to the bar 52. To permit adjustment in length of the bar 52a, the latter may have coacting means such as the slot connection 65, with a thumb screw 66 for easy adjustment.

In operation, the member 39 which is pivoted at 38 oscillates the bell crank lever, and the latter the bar 52a, and hence the cam 56 during the turning of the vehicle. When the pin 41 is changed from one steering groove to another, the length of the bar 52a is changed by the adjustable connection 65. The latter may take various possible forms for automatic or manual adjustment as shown.

In Figs. 6 to 8 is shown a modification in which the steering mechanism is adjusted from the top of the vehicle by a handle 70 to coact with any one of the cams 71, 72, 73 or 74. The vehicle is generally constructed along the same principles as that hereinbefore described, and the frame 75 thereof carries a vertical pivot 76 for mounting an axle 77 for the front wheels 78. A spring 79 mounted in any suitable manner tends to retain the axle 77 in normal straight away driving position. The cams 71 to 74 may be mounted in any suitable manner and may coact with the front axle 77 by a connection such as 50 hereinbefore described for operating the rear axle about a horizontal pivot. To steer the front wheels, a lever means 80 acts between a bracket 81 of the axle 77 and any one of the cams 71 to 74. The lever 80 has a pin 82 selectively following the cam grooves, and also a pin 83 slidingly engaged in a slot 84 of the bracket 81. The pivot 85 of the lever is provided by a vertical element 86 extending to the top of the vehicle. Guiding the element 86 are horizontal members 87, 88 at the bottom and top of the vehicle respectively. These members have arcuate slots 89 and 90 which coincide with each other. The slot 89 is narrow to receive an undercut portion 91 of the element 86, and has spaced holes 92 to receive the element, in a manner hereinafter described. At the upper portion of said element is a compression spring 93 acting on a shoulder 94 to tend to elevate said element. The latter has at its lower end a head 95 carrying the lever 80, the same lying against the member 87.

To stop the cams at a predetermined angular position, a suitable brake 96 is pivotally mounted at 97 to engage a stop lug 98 on the means carrying the cams. When the brake is moved counter clockwise in Fig. 7, the drive mechanism is free to rotate, but when moved into the position shown, it stops the cams and the vehicle halts. But the cams always stop in the same angular position, a feature which is of importance, as will be subsequently explained. When the cams are stopped by the brake, they are in such relation to the steering means that the latter is always in straight away driving position as shown in Figs. 1 and 7.

The co-ordination between the cams, the front wheels and the pivot 85 is such that the lever 80 may be moved into engagement with any cam and the element 86 will be in a corresponding hole 92. This is because the cams are suitably related at their stopping position due to brake 96, and also because the axle 77 returns to normal position.

The brake 96 may be of any suitable type, and in the form shown, includes a head 96a having a notch 96b for receiving the stop lug 98, to effect locking engagement therewith. The said head may be carried by an arm 96c which may be resilient to permit release of the lug from the head 96a.

To permit the toy vehicle to be readily stopped while in motion, element 96d extends upward into a position whereby it may be moved by a hand or foot of the operator, which may be disposed to strike or abut said element. For this reason the element 96d extends to a suitable elevation relative to the body of the vehicle.

If the vehicle is permitted to run until the spring 35 unwinds and the vehicle stops through lack of power, the wheels 78 may be at an angle to the alined position. To avoid this result, an automatic stop is provided which is constructed in any suitable manner to stop the vehicle before the spring has fully unwound, and in such specific relation that the steering wheels are in alined position with the vehicle. Therefore the cam shift can be operated as hereinbefore set forth in connection with the brake 96 and stop lug 98. A gear train may be used for the above purpose, but preferably I employ a finger 101 mounted on an arm 102 secured to the pin 97. The said finger is disposed adjacent to the spring to be actuated thereby as the spring unwinds and increases in diameter. For the reception of the finger 101 the spring may be spaced from the circumferential wall of its casing, the outer end of said spring being secured to the casing for example at 103.

In operation, when the spring has unwound to a sufficient extent in driving the vehicle, it contacts the finger 101, which turns the pin 97 and throws the brake 96 into engaging position, to abut the stop lug 98. Any suitable device may be used for assuring a quick locking or unlocking of the brake, as, for example, a spring 104 which acts with respect to the axis of the pin 97 as a dead center.

This device may be readily used in the structure shown in Figs. 1 to 3, the cams in the same being similarly related and the movement of the pin 38 being analogous. Return of the axle 77 to the normal position is caused by the cams, while the springs 11a and 79 afford an added assurance that such action will occur, thus rendering the shifting of the lever entirely reliable. The said springs may also return the steering means independently of the cams, especially as the lever is disengaged therefrom when shifting from one cam to another.

In operation, to change the path of the vehicle, the handle 70 is depressed, bringing 91 into registry with slot 89. Then the handle is moved laterally according to suitable markings 100 at the slot 90 and released. The element 86 then engages in a proper hole 92 and the pin 82 in the required cam groove, all under the actuation of the spring 93.

It will be understood that the steering cams may also be mounted at the upper part of the vehicle and constructed nevertheless according to the principle of the invention.

Figure 10:
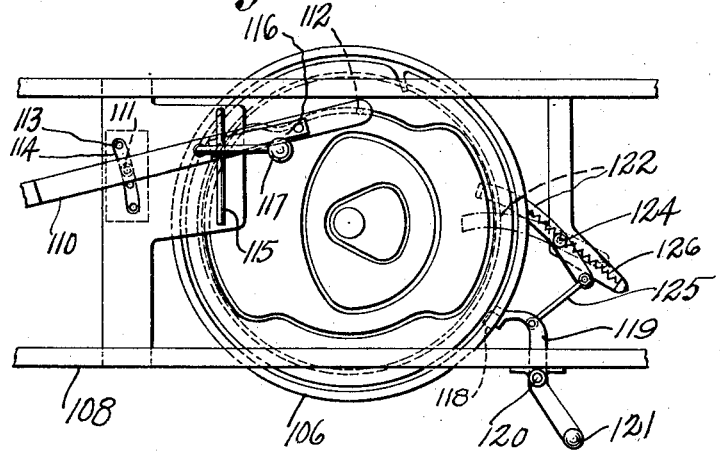
Fig. 10 is a top plan view thereof.

In Figs. 9 and 10 is shown a modification of the invention which embodies the principles hereinbefore set forth, but in a specifically different form as to the cam control, whereby the construction may be simplified as to certain details thereof. By this arrangement, the cam plate 106 is positioned above the spring motor 107 and closely adjacent to the frame 108 of the vehicle. The spring motor includes a winding shaft 109 which may extend downward. The cam plate is connected in alinement with the spring motor. A lever arm 110 for steering the front wheels of the vehicle is provided with a pivot pin 111 and a follower pin 112 for selectively coacting with the cams of the cam plate. Secured to the underside of the frame 108 are a plurality of plates 108a and 108b, the latter having a plurality of holes 113 for receiving the pivot pin. The plate 108a is above the plate 108b, and has a slot 114 which provides a countersunk guide for the pivot pin 111 in moving the same from one hole 113 to another pivot hole. Secured to the frame or plate 108a is a bar 115 with which a leaf spring 116 attached to the lever 110 has abutting and sliding contact. An arm 117 is fastened to the said lever, whereby the lever may be raised to lift the pivot pin 111 and shift the same, the spring 116 yielding and then actuating the lever down to retain the pivot pin in engagement with the required hole 113.

To stop the vehicle with the front wheels in alined position, a lug 118 is formed on the cam plate to abut a movable catch lever 119 pivotally mounted at 120 and having an upward extending actuator bar 121. A finger 122 is moved by the spring 107 when it has unwound to the desired extent to throw the catch into locking position. The finger may be pivoted at 124 and connected to the catch by a link 125. A tension coil spring 126 is mounted to act with respect to pivot 124 as a dead center for a quick locking or release of catch.

Various changes may be made in the construction herein set forth, which is submitted as being merely illustrative, within the principles of the invention as set forth in the following claims.

For example, instead of arranging that the steering wheels be alined with the vehicle when the same is stopped, the steering wheels may be in any predetermined relation to vehicle, regardless of the particular cam which may be employed. It will be understood that the invention herein defined may be interpreted accordingly.

I claim:

1. In a vehicle, a wheeled body, means mounting said wheels to permit relative vertical movement therebetween for uniformly contacting an uneven roadway, steering means for the vehicle, and actuating means carried by the vehicle operated by the steering means to cause the wheels to move as aforesaid for shifting the center of gravity of the vehicle to increase the stability thereof in turning, the actuating means being in inoperative position in the straight-away driving position of the vehicle, the actuating means including a unitary cam means having upward and downward extending portions for the relative vertical movement of the wheels, and an intermediate connecting portion of reduced size.

2. In a vehicle, a wheeled body, means mounting said wheels to permit relative vertical movement therebetween for uniformly contacting an uneven roadway, steering means for the vehicle, and actuating means carried by the vehicle operated by the steering means to cause the wheels to move as aforesaid for shifting the center of gravity of the vehicle to increase the stability thereof in turning, the actuating means being in inoperative position in the straight-away driving position of the vehicle, the actuating means including a unitary cam means having upward and downward extending portions, for the relative vertical movement of the wheels, the cam surfaces of said portions being spaced endwise from each other for releasing and permitting the wheel means to freely respond to irregularities in the roadway in straightaway driving.

3. A device of the character described, including a vehicle, a steering means thereon, a plurality of rotary cams selectively coacting with the steering means, means to stop the cams in a predetermined angular position, the said cams returning the steering means to a given position corresponding to the stopped position of the cams, and pivotal means to connect the cam means with the steering means said pivotal means having pivot points corresponding to the positions of all the cams and of the steering means.

4. A device of the character set forth in claim 3, wherein the pivot means consists of a vertical member extending to the top of the vehicle for convenient manipulation.

5. A device as set forth in claim 3, wherein the pivot means includes an undercut portion, guide means being provided for the pivot means including a slot for receiving the undercut portions, said slot having enlargements at the pivot points for receiving the pivot means and holding the same against movement along the slot.

6. A device as set forth in claim 3, wherein the pivot means includes an undercut portion, guide means being provided for the pivot means including a slot for receiving the undercut portion, said slot having enlargements at the pivot points for receiving the pivot means and holding the same against movement along the slot, and resilient means retaining the pivot means in said enlargements.

7. A device of the character described, including a vehicle, steering means thereon, means to automatically return the steering means to a given position, a plurality of steering cams rotatable as a unit, said cams lying substantially in the same plane, a single lever means connected to the steering means and having a plurality of predetermined pivot points, means to stop the cam unit at a predetermined angular position, the cams being so related to the lever means at the position at which the cams are stopped that the pivot points in co-operation with the steering means, correspond to the individual cams, whereby the lever means can always be engaged with the required cam on locating the lever means at the proper pivot point.

8. A device of the character described, including a vehicle, steering means thereon, means to automatically return the steering means to a given position, a plurality of steering cams rotatable as a unit, said cams lying substantially in the same plane, a single lever means connected to the steering means and having a plurality of predetermined pivot points, means to stop the cam unit at a predetermined angular position, the cams being so related to the lever means at the position at which the cams are stopped that the pivot points, in co-operation with the steering means, correspond to the indivdual cams, whereby the lever means can always be engaged with the required cam on locating the lever means at the proper pivot point, and unitary means to shift the lever means to the proper pivot point and to engage the lever means with the required cam.

9. A device of the character described, including a vehicle, steering means thereon, means to automatically return the steering means to a given position, a plurality of steering cams rotatable as a unit, said cams lying substantially in the same plane, a single lever means connected to the steering means and having a plurality of predetermined pivot points, means to shift the lever means, and means including a slot to guide the shifting means, said slot having enlargements at the pivot points mentioned, said shifting means being engageable in said enlargements to constitute a pivot means for the lever means, said shifting means being movable out of said enlargements and having a reduced portion to register with said slot and guide the shifting means from one to another of said enlargements.

10. A toy vehicle including a motor to drive the same, automatic steering means actuated by the motor, and means to automatically stop the motor with the steering means in position for straight-away driving or in a predetermined direction.

11. A toy vehicle including a motor to drive the same, automatic steering means actuated by the motor, and means to automatically stop the motor with the steering means in position for straight-away driving or in a predetermined direction, said means beng actuated by the motor after a predetermined run thereof.

12. A toy vehicle including a motor to drive the same, automatic steering means actuated by the motor, and means to stop the motor with the steering means in position for driving of the vehicle in a predetermined direction, said means including a manual actuator extending upward above the frame of the vehicle and in such relation thereto as to permit easy motivation of the actuator while the vehicle is in motion.

In testimony whereof I affix my signature.

RAYMOND DE FILIPPIS.